(12) United States Patent
Maier et al.

(10) Patent No.: US 6,826,833 B1
(45) Date of Patent: Dec. 7, 2004

(54) FUEL INJECTION VALVE AND A METHOD FOR MANUFACTURING EXIT OUTLETS ON THE VALVE

(75) Inventors: Martin Maier, Moeglingen (DE);
Guenther Hohl, Stuttgart (DE);
Guenter Dantes, Eberdingen (DE);
Detlef Nowak, Untergruppenbach (DE);
Joerg Heyse, Besigheim (DE); Norbert Keim, Loechgau (DE)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 10/069,310

(22) PCT Filed: Aug. 10, 2000

(86) PCT No.: PCT/DE00/02727
§ 371 (c)(1),
(2), (4) Date: May 14, 2002

(87) PCT Pub. No.: WO01/11229
PCT Pub. Date: Feb. 15, 2001

(30) Foreign Application Priority Data

Aug. 11, 1999 (DE) .......................... 199 37 961

(51) Int. Cl.[7] .............................. B21K 1/24; B05B 1/30; F02M 51/00; F02M 59/00; F02M 61/00

(52) U.S. Cl. ............................... 29/888.44; 239/585.5; 239/533.2; 239/463; 239/601

(58) Field of Search ............................. 239/585.5, 533.2, 239/533.12, 463, 601, 585.1, 585.2, 585.3, 585.4, 533.9, 533.11, 900; 251/129.21, 129.15; 29/888.4, 888.44, 890.122, 890.132

(56) References Cited

U.S. PATENT DOCUMENTS

| 4,069,978 | A | | 1/1978 | El Moussa |
|---|---|---|---|---|
| 4,974,780 | A | * | 12/1990 | Nakamura et al. ....... 239/102.2 |
| 4,986,478 | A | | 1/1991 | Bertini |
| 4,995,559 | A | * | 2/1991 | Okamoto et al. ........... 239/493 |
| 5,108,037 | A | * | 4/1992 | Okamoto et al. ........... 239/473 |
| 5,109,824 | A | * | 5/1992 | Okamoto et al. ........... 123/472 |
| 5,207,384 | A | * | 5/1993 | Horsting ..................... 239/463 |
| 5,209,408 | A | * | 5/1993 | Reiter ...................... 239/585.4 |
| 5,271,563 | A | * | 12/1993 | Cerny et al. ................ 239/463 |
| 5,353,992 | A | | 10/1994 | Regueiro |
| 5,492,277 | A | * | 2/1996 | Tani et al. ................ 239/585.5 |
| 5,915,352 | A | * | 6/1999 | Okamoto et al. ........... 123/298 |
| 6,065,203 | A | * | 5/2000 | Haas et al. ................... 29/505 |

FOREIGN PATENT DOCUMENTS

| DE | 196 36 396 A1 | 3/1998 |
|---|---|---|
| DE | 199 46 693 A | 3/2000 |
| EP | 0 116 864 A | 8/1984 |
| EP | 0 961 026 A | 12/1999 |
| FR | 1 028 214 A | 5/1953 |
| GB | 1 088 666 A | 10/1967 |

OTHER PUBLICATIONS

Yalcin et al: "Konische Einsprizlocher . . ." Technik Report, De Siemens AG., Erlangen, Bd. 2, Nr. 2, Jan. 2, 1999 Seiten 73–74, XP 000828544.
Patent Abstracts of Japan, vol. 008, No. 170 (M–315), Aug. 7, 1984 & JP 59 065562 A, Apr. 13, 1984.

\* cited by examiner

Primary Examiner—Michael Mar
Assistant Examiner—Darren Gorman
(74) Attorney, Agent, or Firm—Michael J. Striker

(57) ABSTRACT

The invention relates among others to a method for producing outlet openings (32) in a valve, in particular a fuel injection valve. The injection valve has a fuel inlet (2), an excitable actuating device (1, 2, 19) by which a valve closing member (28) is movable, a fixed valve seat (27) embodied on a valve seat element (26), with which seat the valve closing member (28) cooperates to open and close the valve, and at least one outlet opening (32), as a fuel outlet, provided downstream of the valve seat (27). The at least one outlet opening 32 is produced in such a way that in a first method step, a through hole is created in the valve seat element (26), and in a second method step, from the ejection end of the through hole, an outlet region is created that is altered in shape and/or size and/or contour compared to the through hole.

15 Claims, 6 Drawing Sheets

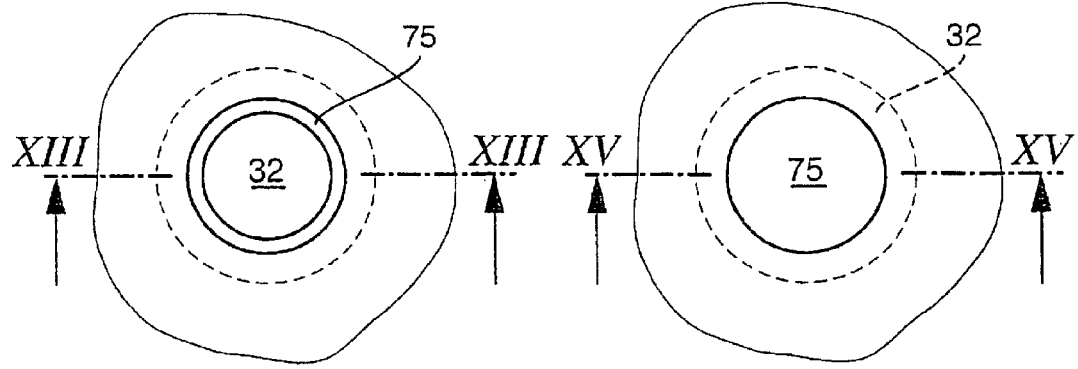
Fig. 12   Fig. 14
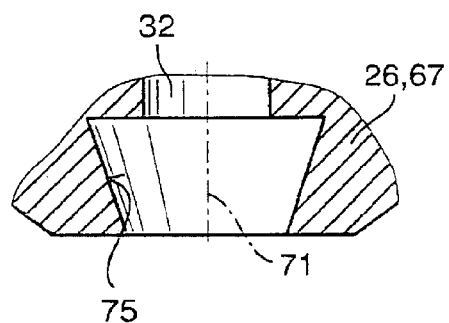
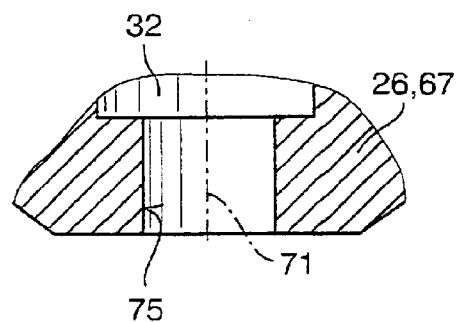
Fig. 13   Fig. 15

FUEL INJECTION VALVE AND A METHOD FOR MANUFACTURING EXIT OUTLETS ON THE VALVE

BACKGROUND OF THE INVENTION

The invention is based on a fuel injection valve and on a method for producing outlet openings in valves.

From German Patent Disclosure DE 196 36 396 A1, a fuel injection valve is already known that, downstream of its valve seat face with which a valve closing body cooperates to open and close the valve, has a perforated disk. This cup-shaped perforated disk, shaped from a metal sheet, has many ejection openings, through which the fuel is output, for instance into an intake tube of an internal combustion engine in the direction of an inlet valve. These ejection openings are made in the perforated disk by stamping, erosion or laser beam boring. The ejection openings have a continuous constant circular or elliptical cross section over their axial length.

SUMMARY OF THE INVENTION

The fuel injection valve according to the invention has the advantage that in a simple, economical way, a very wide range of variation in terms of flow rates, stream angles and spray properties is attainable. Advantageously, fluctuations in the stream angle are reduced. Moreover, structurings of the stream or spray and the creation of solid- and hollow-conical streams can be achieved more simply, even at high combustion chamber counterpressure, than in known fuel injection valves.

It is advantageous that with the fuel injection valve of the invention, a very high atomization quality of a fuel to be ejected can be attained, as well as shapings of the stream or spray that are adapted to given requirements (such as installation conditions, engine configurations, cylinder recesses, spark plug positions). As a consequence, with such an injection valve, among other things exhaust emissions of the engine can be attained, and a reduction in fuel consumption can also be achieved.

Especially in eccentric outlet openings, in which the center point of the inlet plane is not located on the longitudinal axis of the valve, it is advantageous if the inlet portion of the outlet opening has a relatively small opening width, and the outlet region is then markedly widened. In this way, even with such valves, advantageously small diameters for the valve seat face can be adhered to. Compared with known valves of the same design with eccentric outlet openings, the static hydraulic closing load can be decreased, and the tightness at the valve seat can be improved.

It is especially advantageous if the fuel is subjected to a swirl upstream of the outlet opening, because then in the contoured outlet region of the outlet opening, local accumulations of fuel are effectively achieved, which in the form of strands are desirable, especially for direct injection of fuel into a combustion chamber.

The method of the invention has the advantage that with it, in a simple way, a fuel injection valve can be produced with which the aforementioned advantages are attainable.

By the provisions recited in the dependent claims, advantageous refinements of and improvements to the method defined by claim 11 and claim 17 are possible.

Because of the high precision, in particular of the laser contour cutting, very exact outlet regions can be recessed, as a result of which the stream angle fluctuations of the ejected fuel spray can be reduced. The shaping of the outlet regions of the outlet openings by means of laser or electron beam erosion is extremely flexible, especially in comparison with mechanical embossing with embossing dies, for instance. For instance, outlet regions of outlet openings can easily be produced that are polygonal, that widen or taper in the form of a truncated pyramid in the flow direction, that have a circular or elliptical cross section, that widen or taper frustoconically in the flow direction, that are curved in convex or concave fashion, or that are embodied in stepped form with multiple portions.

BRIEF DESCRIPTION OF THE DRAWINGS

Exemplary embodiments of the invention are shown in simplified form in the drawing and explained in further detail in the ensuing description.

FIG. 12 shows a fifth outlet opening in a view from below;

FIG. 13 is a section taken along the line XIII—XIII of FIG. 12;

FIG. 14 shows a sixth outlet opening in a view from below;

FIG. 15 is a section taken along the line XV—XV of FIG. 14;

DESCRIPTION OF THE PREFERRED EMBODIMENTS

Figure 1:
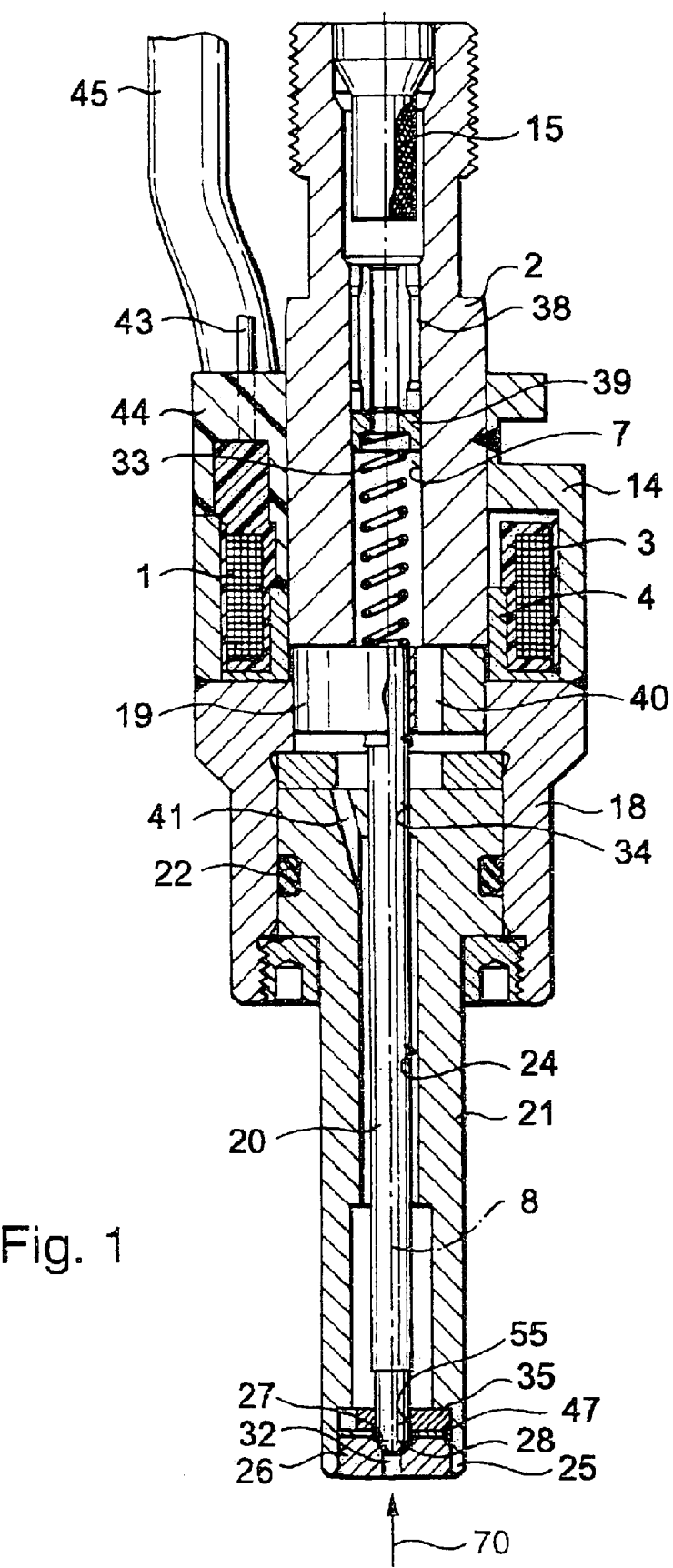
FIG. 1 shows a fuel injection valve in a longitudinal section.

The electromagnetically actuated valve in the form of an injection valve for fuel injection systems of externally ignited internal combustion engines, shown as an exemplary embodiment in FIG. 1, has a tubular, largely hollow-cylindrical core 2, acting as the inner pole of a magnetic circuit and at least partly surrounded by a magnet coil 1. The fuel injection valve is especially well suited as a high-pressure injection valve for direct injection of fuel into a combustion chamber of an internal combustion engine. A coil body 3, which for instance is stepped, of plastic receives a winding of the magnet coil 1 and in conjunction with the core 2 and an annular, nonmagnetic intermediate part 4 of L-shaped cross section that is partly surrounded by the magnet coil 1, it makes an especially compact, short structure of the injection valve in the region of the magnet coil 1 possible.

A continuous longitudinal opening 7 is provided in the core 2, extending along a longitudinal axis 8 of the valve.

The core 2 of the magnetic circuit also serves as a fuel inlet neck, and the longitudinal opening acts as a fuel supply conduit. An outer, metal (for instance ferritic) housing part 14 is solidly connected to the core 2 above the magnet coil 1; as the outer pole or outer conductor element, it closes the magnetic circuit and completely surrounds the magnet coil 1, at least circumferentially. On the inlet side, a fuel filter 15 is provided in the longitudinal opening 7 of the core 2; it assures that fuel components that because of their size could cause the injection valve to become stopped up or damaged are filtered out. The fuel filter 15 is fixed in the core 2, for instance being pressed in.

Together with the housing part 14, the core 2 forms the inlet end of the fuel injection valve; the upper housing part viewed downstream in the axial direction, for instance, extends just past the magnet coil 1. The upper housing part 14 is adjoined tightly and solidly by a lower, tubular housing part 16, which for instance encloses or receives an axially movable valve part, comprising an armature 19 and a rodlike valve needle 20, or an elongated valve seat carrier 21. The two housing parts 14 and 18 are solidly joined together, for instance by a surrounding weld seam.

In the exemplary embodiment shown in FIG. 1, the lower housing part 18 and the largely tubular valve seat carrier 21 are solidly joined together by screwing; however, other possible joining methods are welding, soldering or crimping. The sealing between the housing part 18 and the valve seat carrier 21 is effected by means of a sealing ring 22, for instance. The valve seat carrier 21, over its entire axial length, has an inner through opening 24, which extends concentrically to the longitudinal axis 8 of the valve.

With its lower end 25, which at the same time is the downstream termination of the entire fuel injection valve, the valve seat carrier 21 surrounds a disk-shaped valve seat element 26, fitted into the through opening 24, with a valve seat face 21 that tapers downstream frustoconically. The valve needle 20, which for instance is rod-shaped and has a largely circular cross section, is disposed in the through opening 24; on its downstream end, it has a valve closing portion 28. This valve closing portion 28, which for instance is embodied as spherical or partly spherical or rounded or tapers conically, cooperates in a known manner with the valve seat face 27 provided in the valve seat element 26. The axially movable valve part can also be embodied completely differently from the version shown that has an armature 19, valve needle 20 and valve closing portion 28, for instance as an axially movable valve closing body such as a flat armature. Downstream of the valve seat face 27 in the valve seat element 26, at least one outlet opening 32, designed according to the invention, for the fuel is made. The outlet opening 32 in the exemplary embodiment of FIG. 1 extends concentrically to the longitudinal axis 8 of the valve and ends at a flat, lower face end of the valve seat element 26 that extends perpendicular to the longitudinal axis 8 of the valve.

The actuation of the injection valve is done electromagnetically, in a known manner. As excitable actuating devices, a piezoelectric actuator or a magnetostrictive actuator is equally conceivable, however. Actuation via a controllably pressure-loaded piston is also conceivable. For axial movement of the valve needle 20 and thus for opening counter to the spring force of a restoring spring 33, disposed in the longitudinal opening 7 of the core 2, or closure of the injection valve, the electromagnetic circuit having the magnet coil 1, core 2, housing parts 14 and 18 and armature 19 is used. The armature 19 is connected, for instance by a weld seam, to the end of the valve needle 20 remote from the valve closing portion 28 and is aligned with the core 2. For guidance of the valve needle 20 during its axial motion with the armature 19 along the longitudinal axis 8 of the valve, on the one hand a guide opening 34, provided in the valve seat carrier 21 on the end toward the armature 19, and on the other a disklike guide element 35, disposed upstream of the valve seat element 26 and having a dimensionally accurate guide opening 55 are used. The armature 19 is surrounded, during its axial motion, by the intermediate part 4.

Between the guide element 35 and the valve seat element 26, there is a further disklike element, specifically a swirl element 47, so that all three elements .35, 47 and 26 rest directly on one another and are received in the valve seat carrier 21. The three disklike elements 35, 47 and 26 are solidly joined to one another, for instance by material engagement.

An adjusting sleeve 38, thrust, pressed or screwed into the longitudinal opening 7 of the core 2, serves to adjust the spring prestressing of the restoring spring 33, which via a centering piece 39 rests with its upstream side on the adjusting sleeve 38 and is braced by its opposite side on the armature 19. In the armature 19, one or more borelike flow conduits 40 are provided, through which the fuel can flow from the longitudinal opening 7 in the core 2 as far as the inside of the through opening 24, via connecting conduits 21, near the guide opening 34 in the valve seat carrier 21, that are embodied downstream of the flow conduits 40.

The stroke of the valve needle 20 is predetermined by the installed position of the valve seat element 26. A terminal position of the valve needle 20, when the magnet coil 1 is not excited, is defined by the contact of the valve closing portion 28 with the valve seat face 27 of the valve seat element 26, while the other terminal position of the valve needle 20, with the magnet coil 1 excited, is the result of the contact of the armature 19 with the downstream face end of the core 2. In this last-mentioned stop region, the surfaces of the components are chromium-plated, for instance.

The provision of electrical contact for the magnet coil 1 and thus its excitation are effected via contact elements 43, which are also provided, outside the coil body 3, with a plastic spray-coating 44. The plastic spray-coating 44 can also extend over further components (such as the housing parts 14 and 18) of the fuel injection valve. Extending out of the plastic spray-coating 44 is an electrical connection cable 45, by way of which electric current is supplied to the magnet coil 1. The plastic spray-coating 44 protrudes through the upper housing part 14, which is interrupted in this region.

Figure 2:
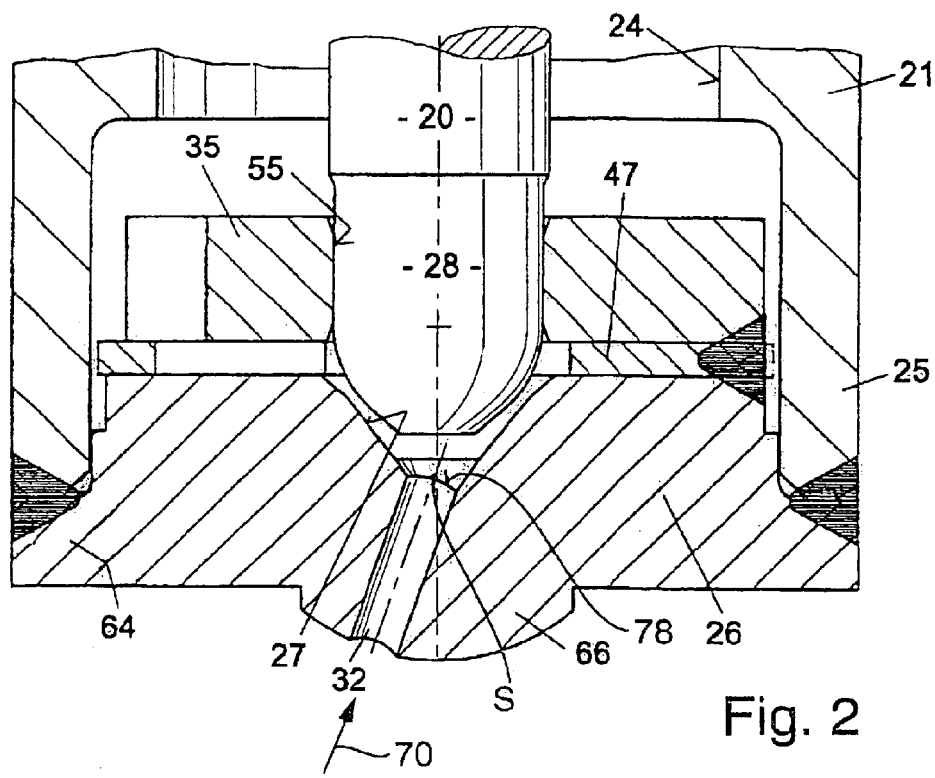
FIG. 2 shows a first, alternative guide and seat region.
Figure 3:
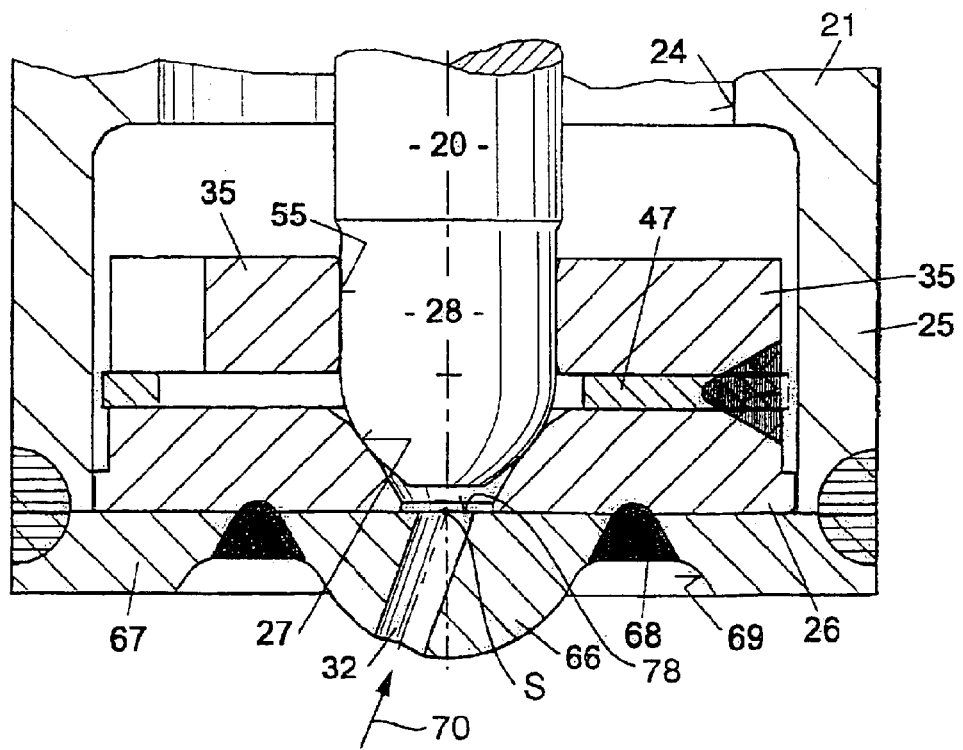
FIG. 3 shows a second, alternative guide and seat region.

In FIGS. 2 and 3, two further examples of guide and seat regions are shown; those parts that remain the same or function the same as in FIG. 1 are identified by the same reference numerals. It should be made clear that all the statements made regarding the production and embodiment of the outlet openings 32 are to be considered independently of the direction of inclination of the outlet openings 32, or the embodiment of the components 26, 27 that have the outlet openings 32.

In the example shown in FIG. 2, the valve seat element 26 has a flange 64, extending all the way around it, which engages the downstream end of the valve seat carrier 21 from below. The outlet opening 32 is made with an oblique inclination to the longitudinal axis 8 of the valve, for instance, and it ends downstream in a convexly curved ejection region 66.

The example shown in FIG. 3 is largely equivalent to the example shown in FIG. 2; the essential difference is that now an additional, fourth disklike ejection region 67 in the form an injection port disk is provided, which has the outlet opening 32. In comparison to FIG. 2, accordingly the valve seat element 26 is split again downstream of the valve seat face 27. The ejection region 67 and the valve seat element 26 are solidly joined to one another, for instance by means of a weld seam 68 made by laser welding, the welding being done in an annularly encompassing indentation 69. Besides laser welding, bonding or resistance welding, among other methods, are also conceivable as suitable joining processes to make this connection.

In FIGS. 4–18, nine variant embodies of outlet openings 32 are shown as examples. FIGS. 4, 6, 8, 10, 12 and 14 each show outlet openings 32 in a view from below, with the direction of the view on the outlet openings 32 being represented by arrows 70 in FIGS. 1–3. Correspondingly, the sections in FIGS. 5, 7, 9, 11, 13 and 15 are always taken along the respective opening axis 71; the opening axis 71 need not necessarily coincide with the longitudinal axis 8 of the valve, as is indicated by the obliquely inclined outlet openings 32 in FIGS. 2 and 3.

All the outlet openings 32 according to the invention are distinguished by the fact that they are contoured in at least two production steps. The outlet openings 32 in FIGS. 4–13 and 16–18 are made in the applicable component 26, 67 in such a way that in a first method step, a through hole is created. This is done in a conventional way for injection ports of injection valves, by stamping, erosion or laser boring. In a second method step, after that, contouring of the through hole, which until then is for instance circular (or for instance of elliptical cross section) is made, from the ejection end of the through hole. An outlet region 75 of the outlet opening 32 on the ejection side is created, which is altered in shape and/or size and/or contour compared to the through hole. Advantageously, this contouring of the outlet openings 32 is done by a non-metal-cutting production process; the removal of material is in particular accomplished without contact, by means of a strongly focused, high-energy radiation. As a thermal removal method, removal with electron or laser beams is especially attractive.

Figure 4:
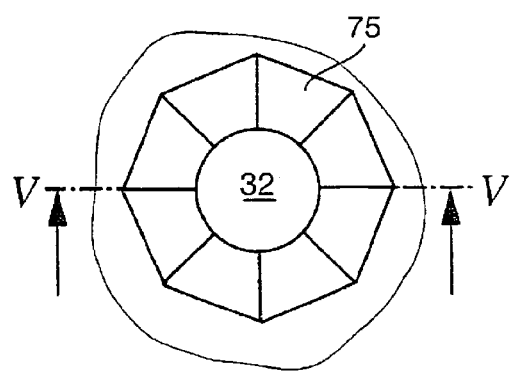
FIG. 4 shows a first outlet opening in a view from below.
Figure 6:
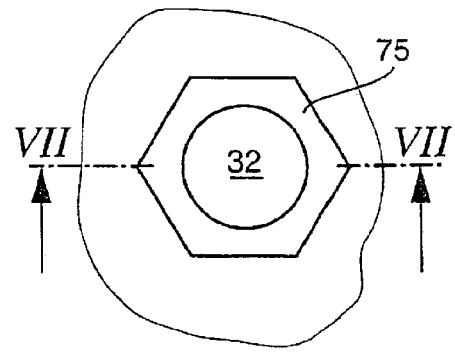
FIG. 6 shows a second outlet opening in a view from below.
Figure 5:
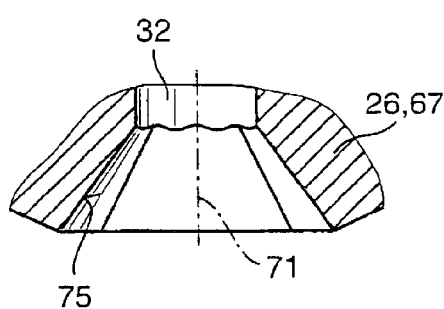
FIG. 5 is a section taken along the line V—V of FIG. 4.
Figure 7:
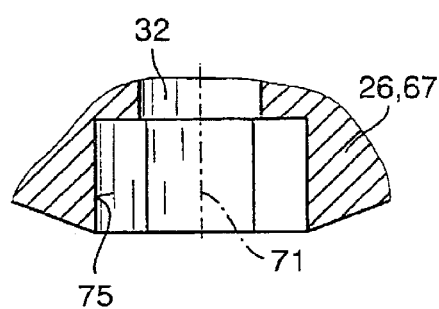
FIG. 7 is a section taken along the line VII—VII of FIG. 6.
Figure 8:
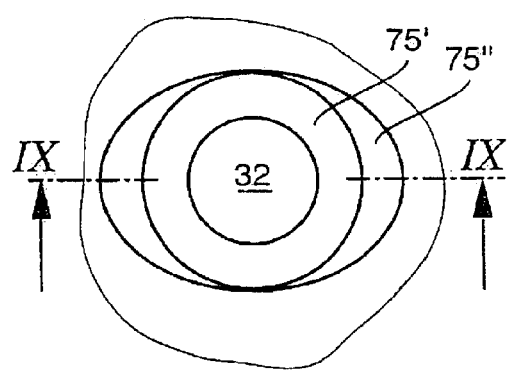
FIG. 8 shows a third outlet opening in a view from below.
Figure 10:
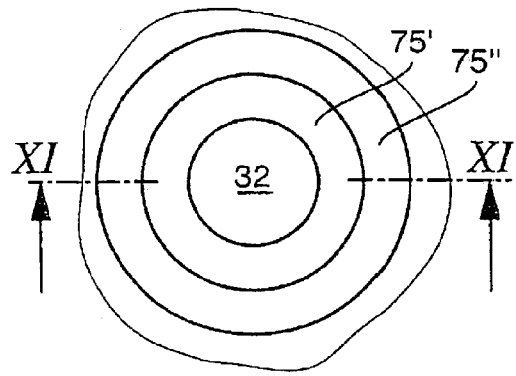
FIG. 10 shows a fourth outlet opening in a view from below.
Figure 9:
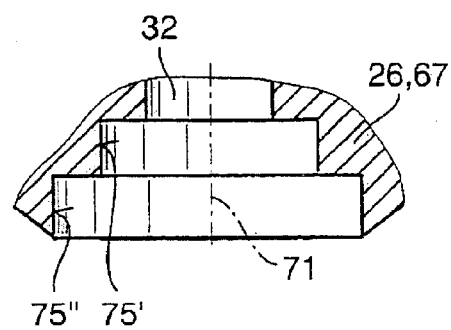
FIG. 9 is a section taken along the line IX—IX of FIG. 8.
Figure 11:
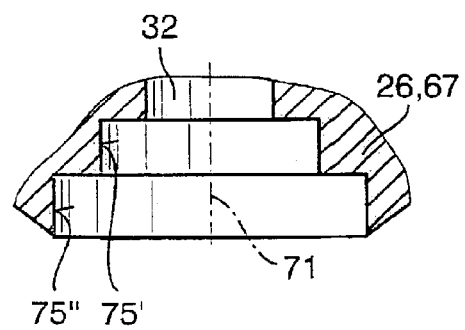
FIG. 11 is a section taken along the line XI—XI of FIG. 10.

FIGS. 4 and 5 show an outlet opening 32 has a circular cross section in the region of the through hole that is not further contoured, which is adjoined by an outlet region 75 that widens in the downstream direction. This outlet region 75 has the shape of an octagonal truncated pyramid. Conversely, in FIGS. 6 and 7 an exemplary embodiment of an outlet opening 32 is shown in which the outlet region 75 is hexagonal, and the walls of the outlet region 75 extend axially parallel to the opening axis 71. Polygonal outlet regions 75 are not limited to having six or eight sides; on the contrary, quite easily and extremely precisely, outlet regions 75 with at least three sides in any arbitrary number of sides can be recessed by removing material using electron or laser beams. The angularity of the outlet region 7 causes discontinuities in the spray to be ejected. This prevents constrictions of the spray that could otherwise arise in injection at a high counterpressure. It is especially advantageous if, as described in conjunction with FIG. 1, the fuel is subjected to a swirl, because then in the contoured outlet region 75, local accumulations of fuel are effectively achieved, which are desired as strands, particularly in direct injection of fuel into a combustion chamber.

In FIGS. 8–11, two exemplary embodiments of outlet openings 32 are shown, which instead of a polygonal outlet region 75 have a circular or an oval/elliptical outlet region 75. In both examples, the outlet region 75 is made in two stages; the portion located the farthest downstream always has the largest opening width. While in the example of FIGS. 8 and 9 the first portion 75' is embodied as circular and the second portion 75" is embodied as elliptical, the first and second portions 75', 75" in the example of FIGS. 10 and 11 each have a circular cross section, and the diameter of the portion 75" is greater than the diameter of the portion 75'. With the aid of such contoured outlet openings 32, widenings of the fuel stream can easily be achieved, so that the ejected sprays take the form of a round or oval hollow cone.

FIGS. 12 and 13 show an exemplary embodiment of an outlet opening 32 that has a frustoconical outlet region 75. Besides a conical variant embodiment that widens in the downstream direction and is shown in FIG. 16, an outlet region 75 that tapers conically in the downstream direction can also be created according to the invention.

In FIGS. 14 and 15, an outlet opening 32 is shown which is created by a different mode of production. Instead of a through hole, first, in a first method step, a blind bore is made in the component 26, 67, for instance by erosion or laser boring., In a second method step, after that, the desired outlet opening 32 is contoured, from the ejection end of the component 26, 67. This contouring of the outlet opening 32 is advantageously again done by a non-metal-cutting production process, and as a removal method, removal with electron or laser beams can be considered in particular. In the example shown, the opening width of the outlet region 75 is less than the opening width of the blind bore made before that.

Figure 16:
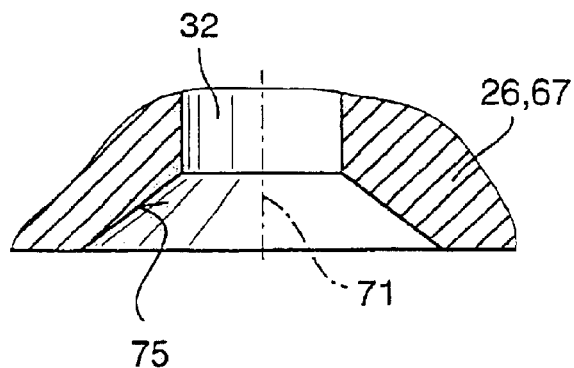
FIG. 16, a section through a seventh outlet opening.
Figure 17:
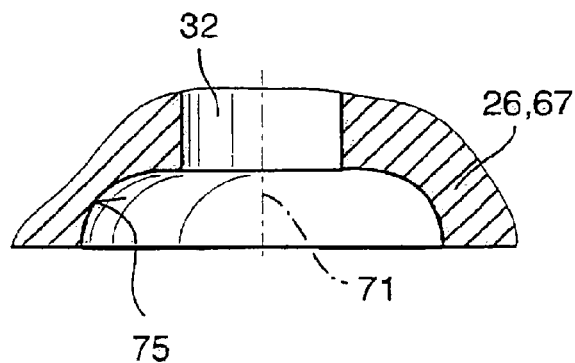
FIG. 17, a section through an eighth outlet opening.
Figure 18:
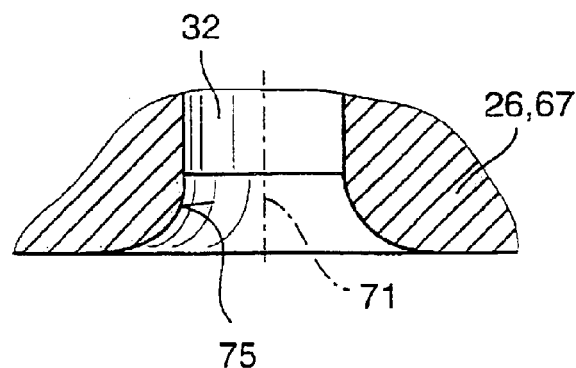
FIG. 18, a section through a ninth outlet opening.

In FIGS. 16–18, three further exemplary embodiments of outlet openings 32 are shown. These outlet openings 32 have either a conical outlet region 75, which widens frustoconically in the flow direction (FIG. 16), or a widening, concavely curved outlet region 75 in the form of a spherical portion (FIG. 17), or a widening, parabolic, convexly curved outlet region 75 (FIG. 18).

FIGS. 1–3 show outlet openings 32 whose inlet planes are each disposed centrally, which is meant to indicate that the opening axis 71 intersects the longitudinal axis 8 of the valve precisely in an inlet plane 78 of the outlet opening 32. These points of intersection are marked S in FIGS. 2 and 3. If the outlet opening 32 is embodied concentrically to the longitudinal axis 8 of the valve, as shown in FIG. 1, the opening axis 71 and the longitudinal axis 8 of the valve coincide. It should be expressly pointed out that this kind of central embodiment of the outlet opening 32 with respect to the inlet plane 78 in no way is a condition for the fuel injection valve of the invention. On the contrary, the described contoured outlet openings 32 can also be made eccentrically, so that in that case the applicable inlet plane 78 has a center point which is not located on the longitudinal axis 8 of the valve. Especially in such eccentric outlet openings 32, it is advantageous if the inlet portion of the outlet opening 32 with the inlet plane 78 has a relatively small opening width, and then the outlet region 75 is markedly widened. In this way, even with eccentric outlet openings 32 in the valve seat element 26, small sealing diameters at the valve seat face 27 can be adhered to.

Besides the aforementioned removal methods using electron or laser beams, still other methods are conceivable with which contouring of the outlet opening 32 from its ejection end can be done. Examples are water-jet cutting or mold wire erosion.

What is claimed is:

1. A method of producing outlet openings in a fuel injection valve having a fuel inlet, an excitable actuating device, a valve closing member movable by the excitable actuating device, a valve seat element having a fixed valve seat with which the valve closing member cooperates for opening and closing the valve, at least one outlet opening as a fuel outlet provided downstream of the valve seat, the method comprising the steps of producing a throughhole in a first method step; creating in a second method step from an election end of the throughhole an outlet region so that it is varied with a parameter selected from the group consisting of a shape, a size, a contour, and a combination thereof, compared to the through hole; recessing the throughole by a process selected from the group consisting of a stamping, an erosion and a laser beam boring; and recessing the outlet region by a non-metal-cutting production process.

2. A method as defined in claim 1, wherein said recessing the outlet region Includes recessing the outlet region with a highly focused, high-energy radiation of beams selected from the group consisting of electron beams and laser beams.

3. A method as defined in claim 1, wherein said recessing the outlet region includes recessing the outlet region by a mold wire erosion.

4. A method as defined in claim 1, wherein said producing the throughhole in the first method step includes producing the throughhole with a cross-section selected from the group consisting of a circular cross-section and an elliptical cross-section.

5. A method as defined in claim 1, wherein said creating the outlet region of the outlet opening in the second method step includes creating the outlet region with in a multi-cornered shape.

6. A method as defined in claim 1, wherein said recessing the outlet region of the outlet opening created in the second method step includes recessing the outlet region with a cross-section selected from the group consisting of a circular cross-section and an elipting cross-section.

7. A method as defined in claim 1, wherein said recessing of the outlet region of the outlet opening produced in the second method step includes recessing the outlet region so that the outlet region is recessed with a shape selected from the group consisting of a convex shape and a concave shape.

8. A method as defied in claim 1, wherein said recessing the outlet region of the outlet opening created in the second method step includes recessing the outlet region which is recessed in a flow direction with several portions which follow each other and which are different from one another by a parameter selected from the group consisting of shape, size contour, and a combination thereof.

9. A method for producing outlet openings in a fuel injection valve having a fuel inlet, an excitable actuating device, a valve closing member movable by the excitable actuating device, a valve closing member cooperating with the valve seat for opening and closing the valve, at least one outlet opening as a fuel outlet provided downstream of the valve seat, the method comprising the steps of creating in a first method step a blind bore from an inlet side and opposite to an injection end; creating in a second method step from the injection end of the outlet opening an outlet region up to the blind bore, far enough to create a continuous outlet opening; recessing the blind bore by a process selected from the group consisting of an erosion and a laser beam boring; recessing the outlet region by a non-metal-cutting production process.

10. A method as defined in claim 9, wherein said recessing the outlet region includes recessing the outlet region by a highly focused, high-energy radiation, with beams selected from the group consisting of electron beams and laser beams.

11. A method as defined in claim 9, wherein said recessing the outlet region includes recessing the outlet region by a mold wire erosion.

12. A method as defined in claim 9, wherein said recessing of the outlet region of the outlet opening created in the second method step includes recessing the outlet region with a multi-membered shape.

13. A method as defined in claim 9, wherein said recessing of the outlet region of the outlet opening created in the second method step includes recessing the outlet region with a cross-section selected from the group consisting of a circular cross-section and an elipting cross-section.

14. A method as defined in claim 9, wherein said recessing of the outlet region of the outlet opening crated in the second method step includes recessing the outlet region that the outlet region is recessed with a shape selected from the group consisting of a convex shape and a concave shape.

15. A method as defined in claim 9, wherein said recessing the outlet region of the outlet opening created in the second method step includes providing in the outlet region several portions in a flow direction, which have a different parameter selected from the group consisting from a shape, a size, a contour, and a combination thereof.

* * * * *